(12) United States Patent
Ohmori et al.

(10) Patent No.: US 6,177,508 B1
(45) Date of Patent: Jan. 23, 2001

(54) POLYURETHANE RESIN TYPE COMPOSITION FOR SLUSH MOLDING

(75) Inventors: Hideki Ohmori, Kyoto; Yoshitsugu Takai, deceased, late of Kyoto, by Eriko Takai, legal representative; Junzo Ukai, Nagoya; Hideo Nishimura; Kazuo Kobayashi, both of Toyota, all of (JP)

(73) Assignees: Sanyo Chemical Industries, Ltd., Kyoto-fu; Toyota Jidosha Kabushiki Kaisha, Aichi-ken, both of (JP)

( * ) Notice: Under 35 U.S.C. 154(b), the term of this patent shall be extended for 0 days.

(21) Appl. No.: 09/346,304

(22) Filed: Jul. 2, 1999

(30) Foreign Application Priority Data

Jul. 6, 1998 (JP) .................................................. 10-189990

(51) Int. Cl.$^7$ .............................. C08L 75/00; C08K 5/20; C08G 8/18
(52) U.S. Cl. .......................... 524/590; 524/231; 524/232; 524/813; 524/872; 524/873; 528/45
(58) Field of Search .................................... 524/590, 871, 524/872, 873, 874, 875, 876, 904, 813, 231, 232, 235; 525/454; 528/45

(56) References Cited

U.S. PATENT DOCUMENTS

| | | | |
|---|---|---|---|
| 4,016,120 | * | 4/1977 | Matsuda et al. ..................... 260/29.2 |
| 4,596,835 | * | 6/1986 | Werner et al. ......................... 524/122 |
| 4,797,320 | * | 1/1989 | Kopp et al. ......................... 428/316.6 |
| 4,985,490 | | 1/1991 | Rosthauser et al. . |
| 5,077,339 | | 12/1991 | Grögler et al. . |
| 5,096,993 | | 3/1992 | Smith et al. . |
| 5,097,010 | * | 3/1992 | Markle et al. ......................... 528/390 |
| 5,210,127 | | 5/1993 | Werner et al. . |
| 5,521,247 | * | 5/1996 | Dobler et al. .......................... 524/591 |
| 5,658,617 | * | 8/1997 | Gobel et al. ......................... 427/372.2 |

FOREIGN PATENT DOCUMENTS

| | | |
|---|---|---|
| 810 489 | 3/1959 | (GB) . |
| 53-29705 | 8/1978 | (JP) . |
| 59-39464 | 9/1984 | (JP) . |
| 60-30688 | 7/1985 | (JP) . |
| 5-43826 | 2/1993 | (JP) . |
| 5-279485 | 10/1993 | (JP) . |
| 7-133423 | 5/1995 | (JP) . |
| 411019948 * | 2/1999 | (JP) . |

OTHER PUBLICATIONS

R. F. Fedors, A Method for Estimating Both the Solubility Parameters and Molar Volumes of Liquids, Polymer Engineering and Science, vol. 14, No. 2, pp. 147–154, (1974).
Derwent Abstract—JP 4–255755 (1992) (Abstract Only).
Derwent Abstract—JP 8–120041 (1996) (Abstract Only).

* cited by examiner

Primary Examiner—Edward J. Cain
Assistant Examiner—Katarzyna Wyrozebski
(74) Attorney, Agent, or Firm—Finnegan, Henderson, Farabow, Garrett & Dunner, L.L.P.

(57) ABSTRACT

A composition suitable for slush molding is disclosed. The composition comprises a thermoplastic polyurethane elastomer (A) having a number average molecular weight of 10,000 to 50,000, a glass transition point of not higher than −35° C. and a heat softening initiation temperature of 100 to 160° C.; a plasticizer (B); a blocked polyisocyanate (C); a pigment (D); and a blocking inhibitor (E) comprising a resin powder which is not heat-softened even at 160° C. and has an average particle diameter of not more than 10 $\mu$m. The composition has a wide mold temperature range, and provides a molded article excellent in properties at low temperature, anti-fogging, thermal aging resistance and light aging resistance.

19 Claims, No Drawings

POLYURETHANE RESIN TYPE COMPOSITION FOR SLUSH MOLDING

FIELD OF THE INVENTION

The present invention relates to a composition for slush molding, more particularly to a slush molding composition capable of being molded within a wide temperature range having excellent thermal meltability.

BACKGROUND OF THE INVENTION

Slush molding permits molding without difficulty of complicated forms as undercut, deep drawing or the like, with the skin thickness kept uniform and at a high yield. On the strength of those advantages, the slush molding process has been widely practiced for molding various articles as interior component parts of motor vehicles. In this molding, soft polyvinyl chloride (PVC) powder has mainly been used as exemplified by unexamined Japanese Patent Publication No. H05-279485.

One problem is, however, that because of a high content of a low molecular weight plasticizer, the softened PVC loses its soft feel at temperatures below the solidifying point of the plasticizer. Other problems are encountered in service for a long time: (1) formation of oil film of evaporated plasticizer on the automobile front windshield, (2) loss in matting effect and soft touch as a result of migration of the plasticizer to the surface of the molded article, and (3) yellowing from the degradation of PVC with passage of time.

Efforts have been made to solve those problems, and there are known some improved versions. For example, flexible thermoplastic polyurethane resin are proposed as main materials to provide soft touch without a plasticizer as disclosed in Unexamined Japanese Patent Publication No. H08-120041.

However, there has been such a problem that, when a thermoplastic polyurethane resin is used as a main resin, blocking between particles is liable to occur because the resin has flexibility and, when an inorganic filler is used for the purpose of preventing the blocking, the hot-melt viscosity becomes higher and the resin can be molded only within a very narrow temperature range.

SUMMARY OF THE INVENTION

An object of the present invention is to solve the problems described above and to provide a composition for slush molding, which can be molded within a wide temperature range. Another object of the present invention is to provide a composition for slush molding, which exhibits large elongation at low temperature. Still another object of the present invention is to provide a composition for slush molding, which is suited for a molded article such as automotive instrument panel.

To solve the problems described above, the present invention provides a polyurethane resin composition for slush molding, comprising a thermoplastic polyurethane elastomer (A) having a number average molecular weight of 10,000 to 50,000, a glass transition point of not higher than $-35°$ C. and a heat softening initiation temperature of 100 to $160°$ C., a plasticizer (B), a blocked polyisocyanate (C), a pigment (D) and a blocking inhibitor (E), characterized in that (E) is a resin powder which is not heat-softened at a temperature of not higher than $160°$ C. and has an average particle diameter of not higher than 10 $\mu$m.

Based on the thermoplastic polyurethane elastomer (A), the composition of the present invention can reduce the content of the plasticizer unlike the prior art, thus cutting down the negative effects brought about by use of the plasticizer in a large quantity.

By adding the predetermined blocking inhibitor (E), the blocking is inhibited even when using the thermoplastic polyurethane elastomer (A), thereby making it possible to mold within a wide temperature range.

The slush molding composition of the present invention gives molded products having the following advantages:

1. It is possible to mold within a wide mold temperature and a method of controlling the temperature of the mold is not limited.
2. High elongation at low temperature as compared with the conventional PVC-type material, and therefore suitable as crack-free surface skin on an instrument panel for use in cold districts. There is no fear of breaking apart when an air bag installed inside the instrument panel for the front seat next to the driver is activated and inflated in the cold season. Thus, the composition of the present invention is useful in protecting the automobile passenger.
3. Excellent in thermal aging resistance, light aging resistance and other properties as compared with the conventional PVC-type material, and therefore suitable for long-term outdoor use.

On the strength of those advantages, the slush molding composition of the present invention is very useful as automobile interior material, for example, for instrument panel and also applicable to other molded articles such as sofa surface skin and others.

DETAILED DESCRIPTION OF THE INVENTION

The thermoplastic urethane elastomer (A) according to the present invention is formed by reacting an isocyanate group-terminated urethane prepolymer (a) derived from an excess non-aromatic diisocyanate (a1), a high-molecular weight diol (a2) having a number average molecular weight of 500 to 10,000 and, optionally, a low-molecular weight diol (a3) with a non-aromatic diamine (b1) and a mono- or di-alkanolamine (b2) containing 2 to 4 carbon atoms in the hydroxyalkyl group.

The aforesaid non-aromatic diisocyanates (a1) include ① aliphatic diisocyanates with 2 to 18 carbon atoms (except the carbons in the NCO group, similarly hereinafter), e.g., ethylene diisocyanate, tetramethylene diisocyanate, hexamethylene diisocyanate (hereinafter referred to as HDI), dodecamethylene diisocyanate, 2,2,4-trimethylhexamethylene diisocyanate, lysine diisocyanate, 2,6-diisocyanatomethyl caproate, bis(2-isocyanatoethyl) fumarate, bis(2-isocyanato ethyl)carbonate, 2-isocyanatoethyl-2,6-diisocyanatohexanoate, and the like; ② alicyclic diisocyanates with 4 to 15 carbon atoms, e.g., isophorone diisocyanate (hereinafter referred to as IPDI), dicyclohexylmethane-4,4'-diisocyanate (hereinafter referred to as hydrogenated MDI), cyclohexylene diisocyanate, methyl cyclohexylene diisocyanate (hereinafter referred to as hydrogenated TDI), bis(2-isocyanato ethyl)-4-cyclohexene, and the like; ③ araliphatic isocyanate with 8 to 15 carbon atoms, e.g., m- and/or p-xylylene diisocyanate (hereinafter referred to as XDI), $\alpha,\alpha,\alpha',\alpha'$-tetramethyl xylylene diisocyanate (hereinafter referred to as TMXDI), and the like; ④ modified diisocyanates from these, e.g., diisocyanates having a carbodiimide group, an urethodione group, an urethoimine group or an urea group; and ⑤ mixtures of two or more of those compounds.

Among these compounds, preferred are alicyclic diisocyanates, particularly IPDI and hydrogenated MDI.

Suitable high molecular weight diols (a2) include polyester diols, polyether diols, polyether ester diols, and mixtures of two or more of those compounds.

As the aforesaid polyester diol can be cited: ① condensation polymerizates between a low molecular weight diol and a dicarboxylic acid or its ester-forming derivative (acid anhydride, lower alkyl ester with one to 4 carbon atoms, acid halide, and the like); ② ring opening polymerizates of a lactone monomer with a low molecular weight diol as initiator; and mixtures of two or more of those compounds.

The aforesaid low molecular weight diol usually has a molecular weight of 62–about 500. Examples of such diol include: aliphatic diols with 4 to 12 or more carbon atoms [linear ones such as ethylene glycol, diethylene glycol, 1,3-propanediol, 1,4-butanediol, 1,5-pentanediol, 1,6-hexanediol, 1,8-octanediol, and the like, branched ones such as propylene glycol, neopentyl glycol, 3-methyl-1,5-pentanediol, 2,2-diethyl-1,3-propanediol, 1,2-butanediol, 1,3-butanediol, and 2,3-butanediol]; diols that contain cyclic group such as 1,4-bis(hydroxymethyl)cyclohexane, m-xylylene glycol, and p-xylylene glycol, ethylene oxide adduct of bisphenol A having a molecular weight less than 500, and the like; and mixtures of two or more of those compounds. Of these compounds preferable are branched aliphatic diols, particularly neopentyl glycol.

Examples of the dicarboxylic acid or its ester-forming derivative in aforesaid ① include aliphatic dicarboxylic acids with 4 to 15 carbon atoms such as succinic, adipic, sebacic, glutaric, azelaic, maleic and fumaric acids; aromatic dicarboxylic acids with 8 to 12 carbon atoms such as terephthalic and isophthalic acids; their ester-forming derivatives such as acid anhydrides, lower alkyl esters (e.g., dimethyl ester, diethyl ester), acid halides (e.g., acid chlorides; and mixtures of two or more of these compounds.

Examples of the lactone monomer in aforesaid ② include γ-butyrolactone, ε-caprolactone, γ-valerolactone and mixtures of two or more of these compounds.

As the aforesaid polyether diol can be cited ones with alkylene oxide added to a dihydroxyl compound such as the aforesaid low molecular weight diol and dihydric phenols.

Among the dihydric phenols are bisphenols, e.g., bisphenol A, bisphenol F and bisphenol S, and monocyclic phenols e.g., catechol and hydroquinone.

Suitable alkylene oxides include ones containing 2–8 carbon atoms, for example, ethylene oxide (hereinafter, referred to as "EO"), propylene oxide (hereinafter, referred to as "PO"), 1,2-butylene oxide, 1,3-butylene oxide, 1,4-butylene oxide, 2,3-butylene oxide, styrene oxide, α-olefin oxide with 5 to 10 or more carbon atoms, epichlorohydrin, and combinations of two or more of these compounds, which may be added blockwise and/or randomwise.

Of those polyether diols, preferable are ones with alkylene oxide added to a low molecular weight aliphatic diol, and more preferable ones with PO added.

As the aforesaid polyether ester diol can be cited condensation polymerizates between one or more types selected from the aforesaid polyether diols and one or more types selected from the dicarboxylic acids or their ester-forming derivatives cited as the raw materials for the aforesaid polyester diols.

Of those high molecular weight diols (a2), preferable are polyester diols, and more preferable condensed polyester diols derived from one or more types among branched aliphatic diols and one or more types among dicarboxylic acids, still more preferable polyneopentyl adipate diol, in view of providing excellent soft touch.

The number average molecular weight of (a2) is generally 500 to 10,000, and preferably 800 to 5,000, and more preferably 1,000 to 3,000. Soft touch is not obtained in case the number average molecular weight lower than 500, while the required strength is not attained when it is higher than 10,000.

It is possible to use the compounds cited as starting materials for the aforesaid polyester diols as the low molecular weight diol (a3) in combination with (a2) as necessary. Suitable as (a3) are aliphatic diols.

The molar ratio of the respective constituent parts making up the NCO-terminated urethane prepolymer (a) before producing the elastomer (A) to 1 mole of (a1) is this: (a2) generally 0.1 to 0.5 mole, and preferably 0.2 to 0.4 mole; (a3) generally 0 to 0.2 mole, and preferably 0.05 to 0.15 mole.

The content of free isocyanate group in the urethane prepolymer (a) is generally one to 10 wt %, preferably 3 to 6 wt %.

Said elastomer (A) is obtainable by reacting the aforesaid NCO-terminated urethane prepolymer (a) with a non-aromatic diamine (b1) and a mono- or di-alkanolamine (b2) containing 2 to 4 carbon atoms in the hydroxylalkyl group.

Suitable non-aromatic diamines (b1) include cycloaliphatic diamines such as 4,4'-diamino-3,3'-dimethyldicyclohexylmethane, 1,4-diaminocyclohexane, isophoronediamine; aliphatic diamines such as ethylenediamine, hexanediamine; and araliphatic diamines such as xylylenediamine, α,α,α',α'-tetramethylxylylenediamine. Among these compounds preferred are cycloaliphatic diamines and aliphatic diamines, particularly isophoronediamine and hexamethylenediamine.

Suitable mono- or di-alkanolamines (b2) include monoalkanolamines with two to 4 carbon atoms such as monoethanolamine, monopropanolamine, and the like; dialkanolamines with two to 4 carbon atoms such as diethanolamine, dipropanolamine, and the like; and mixtures of two or more of these compounds. Among these compounds, preferred are dialkanolamines, particularly diethanolamine and dipropanolamine.

In the above reaction for formation of (A), an equivalent ratio of (b1) to one equivalent of the isocyanate group of the isocyanate group-terminated urethane prepolymer (a) is usually from 0.2 to 0.7, and preferably from 0.3 to 0.6, while an equivalent ratio of (b2) is usually from 0.02 to 0.2, and preferably from 0.05 to 0.15.

The method of producing the thermoplastic polyurethane elastomer (A) in powder-form used in the present invention is not specifically limited but includes, for example, the following methods:

① method of grinding blocked or pelletized (A) using a method such as freeze-grinding method or icing-grinding method, thereby to obtain a powder of (A);

② method of forming a non-aqueous dispersion of (A) in an organic solvent which does not dissolve (A) (e.g. n-hexane, cyclohexane, n-heptane, etc.) and separating (A) from the non-aqueous dispersion with drying, thereby to obtain a powder of (A) (e.g. method described in Unexamined Japanese Patent Publication No. H04-255755, etc.); and ③ method of forming a water dispersion of (A) in water containing a dispersant and separating (A) from the water dispersion with drying, thereby to obtain a powder of (A) (e.g. methods described in Unexamined Japanese Patent Publication Nos. H07-133423 and H08-120041).

Among them, the method of ③ is preferred in that a powder having a desired particle size can be obtained without using a large amount of the organic solvent.

The number average molecular weight (measured by GPC; hereinafter referred to as Mn) of (A) is generally 10,000 to 50,000, and preferably 15,000 to 30,000. If Mn is less than 10,000, no molded article having the required breaking strength can be obtained. But Mn higher than 50,000 would increase the hot-melt viscosity, affecting the moldability.

The heat-softening initiation temperature of (A) is from 100 to 160° C., and preferably from 130 to 150° C. By adjusting the heat-softening initiation temperature within this range, the blocking between particles does not occur and a powder having good slush moldability can be obtained.

The term "heat-softening initiation temperature" used in the present specification can be measured by using a melting point measuring equipment (e.g. micro-melting point measuring equipment, etc.).

The glass transition point (Tg) of (A) is generally not higher than −35° C., and preferably not higher than −40° C. If Tg is higher than −35° C., the surface skin formed of the slush molding composition will lose the soft touch at a low temperature. Tg mentioned here can be determined by, e.g., differential scanning calorimeter (DSC).

Among the plasticizers (B) suitable in the present invention are phthalic acid esters, e.g., dibutyl phthalate, dioctyl phthalate, butyl benzyl phthalate, di-isodecyl phthalate; aliphatic dibasic acid esters, e.g., di-2-ethyl hexyl adipate, 2-ethyl hexyl sebacate; trimellitate esters, e.g., tri-2-ethyl hexyl trimellitate, tri-ocytl trimellitate fatty acid esters, e.g., butyl oleate; aliphatic phosphoric acid esters, e.g., trimethyl phosphate, triethyl phosphate, tributyl phosphate, tri-2-ethyl hexyl phosphate, tributoxy phosphate; aromatic phosphoric acid esters, e.g., triphenyl phosphate, tricredyl phosphate, trixylenyl phosphate, credyl diphenyl phosphate, xylenyl diphenyl phosphate, 2-ethyl hexyl diphenyl phosphate, tris (2,6-dimethyl phenyl)phosphate; halogenated aliphatic phosphoric acid esters, e.g., tris(chloroethyl)phosphate, tris (β-chloropropyl)phosphate, tris(dichloropropyl)phosphate, tris(tribromoeopentyl)phosphate. Those compounds are used alone or as a mixture of two or more thereof.

Among these compounds, preferred are phthalic acid esters and phosphoric acid esters.

The blocked polyisocyanate (C) that can be used in the present invention comprises a polyisocyanate (c1) blocked with a blocking agent (c2).

(c1) is at least one polyisocyanate selected from among diisocyanates mentioned as example of (a1) and their modified products, e.g., ones containing isocyanurate, biuret and carbodiimide.

The number of isocyanate groups in (c1) is generally 2 or more, preferably 3 to 4. Among these compounds, preferred are isocyanurate-modified isophorone diisocynate, isocyanurate-modified hexamethylene diisocyanate and biuret-modified hexamethylene diisocyanate.

Among (c2) are oximes, e.g., acetoxime, methyl isobutyl ketoxime, diethyl ketoxime, cyclopentanonoxime, cyclohexanonoxime and methyl ethyl ketoxime; lactams, e.g., γ-butyrolactam, ε-caprolactam and γ-valerolactam; aliphatic alcohols with one to 20 carbon atoms, e.g., ethanol, methanol and octanol; phenols, e.g., phenol, m-cresol, xylenol and nonyl phenol; active methylene compounds, e.g., acetyl aceton, ethyl malonate and ethyl acetoacetate; basic nitrogen-containing compounds, e.g., N, N-diethyl hydroxylamine, 2-hydroxypyridine, pyridine N-oxide, 2-mercaptopyridine; and mixtures of two or more thereof.

Among the blocking agent (c2), preferred are oximes, particularly methyl ethyl ketoxime.

The pigments (D) that can be used in the present invention are not restricted in particular, and known organic pigments and/or inorganic pigments can be used.

Among the suitable organic pigments are, for example, insoluble azo pigments, soluble azo pigments, copper phthalocyanine pigments and quinacridone pigments. The inorganic pigments include, for example, chromates, ferrocyanide compounds, metal oxides, metallic salt (e.g., sulfide selenium compounds, sulfate, silicate, carbonate, phosphate), metallic powder and carbon black.

As the blocking inhibitor (E) used in the present invention, there can be used a powdered thermoplastic resin and/or a thermosetting resin, which are heat-softened not even at 160° C. (preferably even at 180° C.) and have an average particle diameter of not more than 10 $\mu$m and preferably from 5 to 0.5 $\mu$m or less. Suitable resins include, for example, polyurethanes, polyimides, styrenic resins, polyamides, acrylic resins, olefinic resins and epoxy resins.

Exemplary of such resins are polyurethanes, polyimides, styrenic resins, polyamides, acrylic resins and epoxy resins as described in U.S. Pat. No. 5,567,563, and olefinic resins as described in U.S. Pat. No. 5,147,750. Illustrative of polyimides are polymerization products of trimellitic acid and/or pyromellitic acid with a diamine having 2–20 or more carbon atoms.

Among them, a preferred one is a thermoplastic resin powder whose heat-softening initiation temperature is usually from 170 to 280° C., and preferably from 180 to 250° C.

When the heat-softening initiation temperature of (E) is not higher than 160° C., the blocking is liable to occur during the storage. In addition, when the average particle diameter of (E) exceeds 10 $\mu$m, the flowability of the power becomes inferior and it becomes difficult to obtain a good molded article having a uniform film thickness.

The quantities to be added to (A) of (B), (C), (D) and (E) per 100 parts, by weight, of (A) are: (B) generally 2 to 20 parts by weight, and preferably 5 to 15 parts by weight; (C) generally 1 to 20 parts by weight, and preferably 5 to 15 parts by weight; (D) generally 0.5 to 5 parts by weight, and preferably 1 to 3 parts by weight; and (E) generally 0.1 to 15 parts by weight, and preferably 0.5 to 10 parts by weight.

If (B) is less than 2 part by weight, the melt viscosity in molding will rise, resulting faulty molding. If the addition exceeds 20 parts by weight, on the other hand, (B) will bleed out on the molded skin surface in a change with passage of time.

The addition of (C) in less than 1 part by weight affects the light resistance and thermal aging resistance, while the use of more than 20 parts by weight results in poor soft feel at low temperature.

If the (D) is less than 0.5 part by weight, the hiding power will be insufficient. With the addition exceeding 5 parts by weight, on the other hand, the molding melt viscosity will rise resulting in faulty molding and increased costs as well.

When the amount of (E) is less than 0.1 parts by weight, the blocking resistance and flowability of the power become inferior and it becomes difficult to obtain a good molded article having a uniform film thickness. On the other hand, when the amount exceeds 15 parts by weight, it becomes difficult to obtain a molded skin surface having a desired breaking strength.

The following methods of preparing the slush molding composition of the present invention are given by way of example, but not limited thereto by any means.

①: A powder of (A), (B), (C), (D) and (E) are blended in a lump in a mixer.

②: (B), (C) and (D) are first blended, and then mixed with a powder of (A), followed by adding (E) to the mixture and mixing.

③: A powder of (A) containing (C) added thereto beforehand is mixed with a blend of (B) and (D), followed by adding (E) to the mixture and mixing.

④: (A) in powder is prepared in the presence of (B), (C) and (D), followed by adding (E) to the powder mixture and mixing.

Of those methods, preferable is the method ② and particularly ③ in that the slush molding composition of aribitrary color is efficiently produced.

Powder mixing apparatuses which are used in preparing the slush molding composition of the present invention are not restricted in particular, and known mixers can be used. Among such powder mixing apparatuses are the high-speed shear type as Henschel mixer, and the low-speed type as Nauta mixer and planetary mixer.

The slush molding composition of the present invention is applied in the form of powder. The powder has an average particle diameter of generally 50 to 400 μm, preferably 100 to 300 μm, more preferably 130 to 200 μm. If powder has an average particle diameter less than 50 μm, then flowability of the powder will be poor, with the powder failing to be introduced into narrow parts of the mold, resulting in faulty molding. With powder having a diameter larger than 400 μm, on the other hand, pin holes can be caused on the molded surface skin.

Another point is that the quantity of the particles with a particle diameter of less than 100 μm in the powder is generally not more than 20 percent by weight, and preferably not more than 10 percent by weight. If the percentage of the particles less than 100 μm in particle diameter exceeds 20 percent by weight, dusting will be caused and the powder will not flow well into the narrow areas in the mold, resulting in faulty molding.

The repose angle of the powder is usually not more than 35°, and preferably not more than 33°, while the spatula angle is usually not more than 50°, and preferably not more than 40°. When the repose angle and spatula angle are not within the above range, the flowability of the powder becomes inferior and it becomes sometimes difficult to mold because the detailed portions of the mold are not filled with powder on slush molding.

The average particle diameter mentioned here is defined as a value of 50% pass particle diameter expressed in the sieve opening through which 50 percent by weight of the sample passes as measured by particle size distribution meter, e.g., TUBUTEC manufactured by LASENTEC LTD. The repose angle and spatula angle are defined as values measured by powder tester manufactured by HOSOKAWA MICRON LTD.

The slush molding composition of the present invention can be mixed, as necessary, with known additives as, for example, releasing agent, light stabilizer, thermal stabilizer and flame retarder.

DESCRIPTION OF THE PREFERRED EMBODIMENTS

Now the present invention will be described in more detail by the following examples but is by no means restricted thereto. In the following description, it is understood, past or parts mean part or parts by weight and percent denotes percent by weight. The raw materials used are supplied by the following manufacturers under the following bran names.

Raw material//Brandname//Manufacturer

Polycaprolactone diol//PLACCEL L220A//DAICEL CHEMICAL INDUSTRIES, LTD.

ε-caprolactam blocked trimer of IPDI//VESTAGON B1530//HULS JAPAN Ltd.

Polyvinyl alcohol//PVA-235//KURARAY CO., LTD.

Neopentyl adipate diol//SANESTOR 5620//SANYO CHEMICAL INDUSTRIES, LTD.

Light stabilizer//DIC-TBS//DAINIPPON INK AND CHEMICALS, INC.

Neopentyl adipate diol//SANESTOR 5620//SANYO CHEMICAL INDUSTRIES, LTD.

Titanium oxide//TIPAQUE R-820//ISHIHARA SANGYO KAISYA, LTD.

Carbon black//#5500F//TOKAI CARBON CO., LTD.

PREPARATION EXAMPLE 1

820 parts of polycaprolactone diol with Mn of 2,000 and a hydroxyl value of 56 was placed in a four-necked flask with a stirrer and thermometer mounted therein and dehydrated under heating for one hour at 110° C. under a vacuum pressure of 3 mmHg. Then 120 parts of IPDI was added and the mixture was allowed to react for 10 hours at 110° C. to give an NCO-terminated urethane prepolymer. The urethane prepolymer was found to contain 3.4 percent of free isocyanate group. This shall be called "Prepolymer (1)."

PREPARATION EXAMPLE 2

230 parts of Prepolymer (1) and 10 parts of ε-caprolactam blocked trimer of IPDI were placed and mixed in a beaker, followed by adding thereto 750 parts of a dispersion medium comprising water and 3 parts of polyvinyl alcohol dissolved therein. The resulting mixture was then stirred for one minute with an ultra disperser (manufactured by YAMATO SCIENTIFIC Ltd.) at 9,000 rpm.

The mixture was transferred into a four-necked flask mounted with a stirrer and a thermometer, and 15 parts of isophorone diamine and 1.5 parts of diethanol amine were added thereto under stirring and allowed to react for 10 hours at 50° C. The reaction product was then filtered and dried to obtain a powdery urethane elastomer having Mn of 40,000, Tg of −48° C., heat softening initiation temperature of 143° C., and average particle diameter of 135 μm. The elastomer was mixed with 0.5 part of light stabilizer to prepare an urethane elastomer powder (F1).

PREPARATION EXAMPLE 3

820 parts of neopentyl adipate with Mn of 2,000 and a hydroxyl value of 56 was placed in a four-necked flask with a stirrer and a thermometer mounted therein and dehydrated under heating for one hour at 110° C. under a vacuum pressure of 3 mmHg. Then 120 parts of IPDI was added and the mixture was allowed to react for 10 hours at 110° C. to give an NCO-terminated urethane prepolymer. The urethane prepolymer was found to contain 3.4 percent of free isocyanate group. This shall be called "Prepolymer (2)."

PREPARATION EXAMPLE 4

230 parts of Prepolymer (2) and 10 parts of ε-caprolactam blocked trimer of IPDI were placed and mixed in a beaker, followed by adding thereto 750 parts of a dispersion medium comprising water and 3 parts of polyvinyl alcohol dissolved therein. The resulting mixture was then stirred for one minute with an ultra disperser (manufactured by YAMATO SCIENTIFIC Ltd.) at 9,000 rpm.

The mixture was transferred into a four-necked flask mounted with a stirrer and a thermometer, and 15 parts of isophorone diamine and 1.5 parts of diethanol amine were added thereto under stirring and allowed to react for 10 hours at 50° C. The reaction product was then filtered and dried to obtain a powdery urethane elastomer having Mn of 40,000, Tg of −55° C., heat softening initiation temperature of 135° C., and average particle diameter of 140 μm. The elastomer was mixed with 0.5 part of light stabilizer to prepare an urethane elastomer powder (F1).

EXAMPLE 1

100 parts of (F1), 10 parts of di-isodecyl phthalate and 1 part of titanium oxide were placed in a Henschel mixer and mixed for one minute at 200 rpm. After that, the mixture was allowed to mature for one hour at 100° C. and then to cool to 40° C. Then 0.5 part of urethane resin powder (average particle diameter of 5 μm, heat softening initiation temperature of 230° C.) as blocking inhibitor was added to obtain a slush molding composition (S1) of the present invention.

EXAMPLE 2

100 parts of (F2), 15 parts of di-isodecyl phthalate and 1 part of titanium oxide were placed in a Henschel mixer and mixed for one minute at 200 rpm. After that, the mixture was allowed to mature for one hour at 100° C. and then to cool to 40° C. Then one part of phthalic maleimide resin powder (average particle diameter of 3 μm, heat softening initiation temperature of 280° C.) as blocking inhibitor was added to obtain a slush molding composition (S2) of the present invention.

EXAMPLE 3

100 parts of (F3), 5 parts of di-isodecyl phthalate, 10 parts of triphenyl phosphate and 2 parts of carbon black were placed in a Henschel mixer and mixed for one minute at 200 rpm. After that, the mixture was allowed to mature for one hour at 100° C. and then to cool to 40° C. Then 0.5 part of stylene resin powder (average particle diameter of 1 μm, heat softening initiation temperature of 200° C.) as blocking inhibitor was added to obtain a slush molding composition (S2) of the present invention.

Comparative Example 1

100 parts of (F2), 5 parts of di-isodecyl phthalate and 2 parts of carbon black were placed in a Henschel mixer and mixed for one minute at 200 rpm. After that, the mixture was allowed to mature for one hour at 100° C. and then to cool to 40° C. Then one part of silica powder (SILYSIA 978 manufactured by FUJI SILYSIA CHEMICAL Ltd.) as blocking inhibitor was added to obtain a comparison slush molding composition (S4).

Testing 1

The compositions (S1), (S2), (S3) and (S4) obtained in Examples 1 to 3 and Comparative example 1 were tested. Each sample was brought into contact with a mold heated to 220° C. for 10 seconds. After hot melting, the unmelted powder was removed out of the melt, which was left standing for one minute at room temperature and cooled in water to give a molded sheet. The molded sheets thus obtained were put to the following tests to examine the properties. The test results are summarized in Table 1.

Breaking strength and elongation (25° C.), low-temperature breaking strength (−35° C.), hardness: ASTM-D638

Molding temperature range: mold temperature range on slush molding where the appearance and molten state of the skin back surface become uniform

TABLE 1

|  | Example 1 | Example 2 | Example 3 | Comparative ex. 1 |
|---|---|---|---|---|
| Composition | S1 | S2 | S3 | S4 |
| Elongation, % | 410 | 370 | 480 | 120 |
| Breaking strength, MPa | 11 | 10 | 10 | 5 |
| Low-temp. Elongation, % | 200 | 175 | 270 | 40 |
| Low-temp. Breaking strength, MPa | 22 | 20 | 24 | 15 |
| Molding temp. range ° C. | 40 | 41 | 45 | 15 |

Table 1 shows that the compositions of Examples are superior to the comparative example in low-temperature elongation and molding temperature range.

Testing 2

Molded sheets were prepared from (S1) to (S4) within the mold in accordance with Testing 1, followed by introducing thereinto urethane foam-forming components of the following formulation to obtain urethane foams with the surface layers of the respective molded sheets (S1) to (S4).

Formulation: 95 parts of an EO-chipped polyoxypropylene triol having Mn of 5,000, 5 parts of triethanol amine, 2.5 parts of water, 1 part of triethylamine and 61.5 parts of a polymeric MDI.

Those moldings were heat treated in a circulating-air drier for 500 hours at 120° C. Then the urethane foams were removed from the respective molded sheets, which were then put to the following tests of the following physical properties. The test results are shown in Table 2.

Elongation (25° C., −35° C.): ASTM-D638

TABLE 2

|  | Example 1 | Example 2 | Example 3 | Comparative ex. 1 |
|---|---|---|---|---|
| Composition | S1 | S2 | S3 | S4 |
| Elongation, % after heating (25° C.) | 300 | 370 | 360 | 10 |
| Elongation, % after heating (−35° C.) | 110 | 98 | 220 | 0 |

Testing 3

The urethane foams with the respective surface layers—(S1) to (S4)—obtained in Testing 2 were tested in a carbon arc fadeometer for 400 hours at a black panel temperature of 83° C. Then the urethane foams were removed from the respective molded sheets, which were then put to the following tests of the following physical properties. The test results are shown in Table 3.

Elongation (25° C., −35° C.): ASTM-D638

TABLE 3

|  | Example 1 | Example 2 | Example 3 | Comparative ex. 1 |
|---|---|---|---|---|
| Composition | S1 | S2 | S3 | S4 |
| Elongation, % subjected to fademeter (25° C.) | 400 | 370 | 500 | 20 |
| Elongation, % subjected to fademeter (−35° C.) | 105 | 91 | 320 | 0 |

As shown in Tables 2 and 3, the molded sheets from the compositions of the present invention is large in elongation as compared with the comparative one. It is clear, therefore, that the invention compositions are excellent in thermal aging resistance and light aging resistance.

What is claimed is:

1. A molded article obtained by slush-molding a composition comprising:
    a thermoplastic polyurethane elastomer (A) having a number average molecular weight of 10,000 to 50,000, a glass transition point of not higher than −35° C. and a heat softening initiation temperature of 100 to 160° C.;
    a plasticizer (B);
    a blocked polyisocyanate (C);
    a pigment (D); and
    a blocking inhibitor (E) comprising a resin powder which is not heat-softened even at 160° C. and has an average particle diameter of not more than 10 μm.

2. The molded article according to claim 1, wherein (E) is a powder of at least one resin selected from the group consisting of thermoplastic resins having a heat softening initiation temperature of higher than 160° C. and thermosetting resins.

3. The molded article according to claim 1, wherein (E) is a thermoplastic resin having a heat softening initiation temperature of 170 to 280° C.

4. The molded article according to claim 1, wherein (E) is a powder of at least one resin selected from the group consisting of polyurethanes, polyimides, styrenic resins, polyamides, acrylic resins, polyesters, olefinic resins and epoxy resins.

5. The molded article according to claim 1, wherein said elastomer (A) has one or more hydroxyl groups in the molecule.

6. The molded article according to claim 1, wherein said elastomer (A) has been obtained by reacting
    an NCO-terminated urethane prepolymer (a) with a non-aromatic diamine (b1), and a mono- or di-alkanolamine (b2) containing 2 to 4 carbon atoms in the hydroxyalkyl group; said urethane prepolymer (a) having been derived from an excess non-aromatic diisocyanate (a1), and a high-molecular weight diol (a2) having a number average molecular weight of 500 to 10,000, with or without a low-molecular weight diol (a3).

7. The molded article according to claim 6, wherein (a2) is at least one diol selected from the group consisting of polyester diols, polyether diols and polyetherester diols.

8. The molded article according to claim 6, wherein (a2) is a polyester diol of a branched aliphatic diol with a dicarboxylic acid.

9. The molded article according to claim 1, wherein (B), (C), (D) and (E) are contained in amounts of 1 to 20 parts by weight, 1 to 20 parts by weight, 0.5 to 5 parts by weight and 0.1 to 15 parts by weight, respectively, based on 100 parts by weight of (A).

10. The molded article according to claim 1, wherein the composition is in the form of a powder having an average particle diameter of 50 to 400 μm and containing not more than 20% by weight of particles less than 100 μm.

11. The molded article according to claim 1, wherein (E) is contained in an amount of 0.1 to 15 parts by weight per 100 parts by weight of (A).

12. The molded article according to claim 1, wherein (B) is contained in an amount of 1 to 20 parts by weight per 100 parts by weight of (A).

13. The molded article according to claim 1, wherein the composition is in the form of a powder having an average particle diameter of 50 to 400 μm.

14. The molded article according to claim 1, wherein the composition is in the form of a powder having a repose angle of not more than 35°.

15. The molded article according to claim 1, wherein the composition is in the form of a powder having a spatula angle of not more than 50°.

16. The molded article according to claim 1, wherein the composition is prepared by mixing a powder of (A) containing (C) added thereto beforehand with a blend of (B) and (D), followed by adding (E) to the powder mixture and mixing them.

17. The molded article according to claim 1, wherein the composition is prepared by blending (B), (C) and (D) and then mixing the resultant blend with a powder of (A), followed by adding (E) to the mixture and mixing them.

18. The molded article according to claim 1, wherein (A) has a number average molecular weight of 15,000 to 30,000.

19. The molded article according to claim 1, wherein (B) is selected from the group consisting of phthalic acid esters, aliphatic dibasic acid esters, trimellitate esters, fatty acid esters, aliphatic phosphoric acid esters and aromatic phosphoric acid esters.

* * * * *